United States Patent
Skeljo (10) Patent No.: US 11,118,814 B2
(45) Date of Patent: Sep. 14, 2021

(54) SOLAR COLLECTOR WITH REFLECTING SURFACES

(71) Applicant: ITRS d.o.o., Zagreb (HR)

(72) Inventor: Kresimir Skeljo, Zagreb (HR)

(73) Assignee: ITRS d.o.o.

(*) Notice: Subject to any disclaimer, the term of this patent is extended or adjusted under 35 U.S.C. 154(b) by 124 days.

(21) Appl. No.: 16/486,413

(22) PCT Filed: Feb. 14, 2018

(86) PCT No.: PCT/HR2018/000004
§ 371 (c)(1),
(2) Date: Aug. 15, 2019

(87) PCT Pub. No.: WO2018/150206
PCT Pub. Date: Aug. 23, 2018

(65) Prior Publication Data
US 2020/0033029 A1    Jan. 30, 2020

(30) Foreign Application Priority Data
Feb. 15, 2017 (HR) ............................ P20170240A (51) Int. Cl.
| F24S 10/50 | (2018.01) |
| F24S 40/50 | (2018.01) |
| F24S 23/70 | (2018.01) |
| F24S 80/50 | (2018.01) |

(52) U.S. Cl.
CPC ............. *F24S 10/502* (2018.05); *F24S 23/70* (2018.05); *F24S 40/50* (2018.05); *F24S 80/50* (2018.05); *F24S 2080/502* (2018.05)

(58) Field of Classification Search
CPC .......... F24S 10/502; F24S 23/70; F24S 80/50; F24S 2080/502
See application file for complete search history.

(56) References Cited

U.S. PATENT DOCUMENTS

| 4,026,268 A * | 5/1977 | Bartos ..................... F24S 10/73 |
| | | 126/626 |
| 4,085,731 A * | 4/1978 | Weir ...................... F24S 23/30 |
| | | 126/634 |

(Continued)

FOREIGN PATENT DOCUMENTS

| DE | 102004032357 A1 | 2/2006 |
| DO | 2837095 A1 | 3/1980 |
| WO | 7900276 A1 | 5/1979 |

*Primary Examiner* — David J Laux
(74) *Attorney, Agent, or Firm* — St. Onge Steward Johnston & Reens LLC (57) ABSTRACT

A solar collector with reflecting surfaces according to the present invention prevents overheating of the solar collector by reflecting the radiation in a way that the light beams, by means of a first transparent surface, are corrected to the preferred angle and further directed towards channels. On a second transparent surface the beams are directed again and on a third transparent surface the light beams are reflected if in the channels is air. If the working fluid flows through the channels, on the third surface there is no reflection, so the light beams pass through the opaque part of an absorber where the solar radiation is converted into the thermal energy that is then removed by the working fluid.

20 Claims, 11 Drawing Sheets

(56) References Cited

U.S. PATENT DOCUMENTS

| | | | | |
|---|---|---|---|---|
| 4,368,725 A * | 1/1983 | McClintock | .......... | F24S 10/503 |
| | | | | 126/595 |
| 8,474,177 B2 * | 7/2013 | Griessen | ................ | A01G 9/243 |
| | | | | 47/17 |
| 9,482,209 B2 * | 11/2016 | Huang | .................... | F24S 90/00 |
| 9,780,724 B2 * | 10/2017 | Kondo | ..................... | G02B 5/00 |
| 9,829,216 B2 * | 11/2017 | Prutsman | .............. | F24S 70/225 |
| 10,386,094 B2 * | 8/2019 | Jilken | ..................... | F24S 10/73 |
| 2017/0254566 A1 * | 9/2017 | Levin | .................... | F24S 10/502 |

\* cited by examiner

DETAIL
Z

SOLAR COLLECTOR WITH REFLECTING SURFACES

FIELD OF THE INVENTION

The present invention relates to solar collectors with reflecting surfaces, and according to the International Patent Classification is classified as F25B 25/00, F25B 27/002 and F25B 30/00.

In solar thermal collectors, hereafter solar collectors, when there is no working fluid flow because of no hot water consumption i.e. under no flow conditions, overheating and so-called stagnation temperature occurs. Overheating is not such a problem with unglazed solar collectors that do not have a selective coating for the prevention of long-wave infrared radiation because raising a solar collector temperature significantly increases radiation and convection losses, and at an insolation of about 1000 W/m$^2$ the solar collector temperature remains below 80° C., which can be withstood by cheap standard polymers (PE, EPDM, etc.). For glazed insulated solar collectors with selective coating that prevents long-term infrared radiation, there are fewer radiation and convection losses, and at an insolation of about 1000 W/m$^2$ the collector temperature rises above 160° C. Such overheating is caused by the accumulation of heat energy. The solar collectors made of metal and glass are resistant to above mentioned temperatures, and the problem of overheating of the working fluid is solved by evaporating the working fluid of the solar collector or by a drain back system or in a third way. Removed fluid, i.e. working fluid, is returned to the collectors when reused, and metals (Al, Cu, Fe, etc.) and the glass from which the collectors are made are resistant to temperatures up to 250° C. Such high stagnation temperatures impede the production of solar collectors out of cheap polymers and require pipes leading to the collector to be resistant to the high pressures that occur when the working fluid, i.e. liquid, turns into a gas. Successfully lowering a stagnation temperature of glazed collectors at temperatures lower than 100° C. would allow for better and simpler constructional solutions for collectors and conduits leading to the collector.

BACKGROUND OF THE INVENTION

There have been several attempts to make technical solutions to prevent high stagnation temperatures inside glazed collectors. The use of double-glazed dyed liquid that evaporates when the temperature rises above a permissible temperature limit was patented by Dockery in 1972; furthermore, the use of dark beads that would swell to double glazing when the collector temperature is too high (Harrison, 1975), and the use of a curtain driven by the engine and drawn when the temperature is too high (Beikircher and Schmidt, 2009). All the above methods are overpriced and unreliable (in case of electricity blackout the protection systems do not work and the collector may be damaged) for the collectors expected to reach at least 20 years of service life, being exposed to environmental influences.

Another method is the use of thermotropic materials that change properties by changing the temperature. When the temperature becomes higher than the desired (in solar collectors over 80° C.), the thermotropic materials change the permeability to the light. This is a good solution, but the known materials used to date are only able to reduce the stagnation temperature by about 20 to 30° C., and none succeeds to reduce the solar collector temperature from 160° C. to less than 100° C.

U.S. Pat. No. 4,085,731 discloses a solar energy system that provides for complete utilization of the solar energy impinging on the solar collectors by having cylindrical lens arranged on a top surface. Structure disclosed in U.S. Pat. No. 4,085,731 enables use of the heat generated in the air section under the insulating panels and special means to utilize a higher percentage of the heat generated in the fluid in the fluid collector panels.

WO79/00276 discloses a novel solar collector/window which can alternatively be utilized either as a passive solar heat collector or an active solar heat collector. When acting as a passive solar collector the chamber is normally filled with air or is evacuated such that light passing from the outside to the interior serves to heat the interior of the structure. When it is desired to prevent or minimize heat from passing into the structure but to retain such heat for later use, a solar energy absorbent fluid is passed through the chamber so as to absorb the energy passing thereinto.

SUMMARY OF THE INVENTION

The present invention is applied to a solar collector whose lateral sides and the lower side are heat insulated, and on the upper side the solar collector is isolated by an outer glazing that can be single or multiple and which can be made of polymers, glass or a transparent composite, and has a built-in material that prevents the infrared radiation loss of the solar collector. With such a well-insulated high-efficiency solar collector, high stagnation temperature can exceed 160° C., which can damage the solar collector or its fittings.

In the present solar collector, as in any given collector, there is an outer transparent plate and there are channels through which the working fluid for heat dissipation flows. However, the channels are on the upper side closed with a transparent plate with inclined surfaces and lenses, and on the bottom side of the channel there is an absorber for the conversion of solar radiation to the heat. Possible transparent materials for the outer plate and the transparent plates are polymer materials PC-polycarbonate, Acrylite, PMMA-[poly (methyl methacrylate)), EFTE (ethylene-tetrafluoroethylene), FEP (fluorinated ethylene-propylene), PVF (polyvinyl fluoride) (polyethylene terephthalate), PVC (polyvinyl chloride), PE (polyethylene) or any other polymeric material suitable for producing solar collectors or glass or transparent composite materials, or their mutual combinations.

The essence of the operation of the present invention is that when the solar collector is not used, and because of the non-flow or circulation of the working fluid there is no heat discharge, the sunlight falling on the solar collector is directed by a lens system and sloping surfaces so that most of the sunlight falling to the back surface of the transparent plate before reaching an absorber is reflected back. Said surface of the transparent plate consists of a multiple V, concave or convex shapes and the sunlight is actually reflected from the two surfaces of one surface back into the environment. This can be achieved in a way that the beams of sunlight, directed by the lens system and its sloping surfaces, reach the sloping surface at an angle greater than the critical angle of the medium from which the light beam comes (e.g., for the boundary between the PC polycarbonate and the air, the critical angle of reflection is 40°). As long as the light beams reflect in the environment, the solar collector can neither be overheated nor used because it does not collect the energy of solar radiation. Therefore, the reflection of light beams must be interrupted as soon as we want to collect solar energy by the solar collector. This is achieved in such a way that when the working fluid starts to flow through the abovementioned channels and thereby removes the heat into the tank, or a space is being heated, the reflection of the sunlight beams will be interrupted because the liquid used has a refractive index sufficiently higher than air (n air=1; n glycol=1.44; water n=1.33), which increases the critical angle (e.g. between PC and glycol 65°) between the transparent material and the working fluid and instead of reflecting, solar radiation passes through to the opaque dark part, namely the absorber. In the present invention, a feed and drainage of a working liquid is based on the so-called 'drain back' system where the working liquid is present in the solar collector channels only when the solar collector is working, and when the solar collector is not working, the working liquid is returned to a tank.

As an example, if the light beam is directed by the lens system and sloping surfaces on the reflecting surface of a transparent plate (located on the boundary with channels filled with air) made of PC (polycarbonate) at a right angle of 90°, and if the transparent plate is toothed with e.g. "V" shapes with an angle at the vertex of 'V' of 90°, the beam of light is then reflected by two surfaces of a 'V' shape because on each surface of the "V" shape they fall at a 45° angle, and are reflected, the angle of incidence of 45° being greater than the 40° which is the critical angle for the PC/air transition, exactly in the direction they came from. If the channels are filled with glycol instead of air, the light beams pass through the "V" surfaces since the angle of incidence of 45° is smaller than 65° which is the critical angle for PC/glycol transition. Passing of the light beams through the transparent plate and their arriving to the absorber will result in the conversion of the solar radiation into the thermal energy that is transmitted through the working fluid.

The same flow principle can also be applied to a solar collector containing two transparent plates between which the working fluid passes. The only difference is that a double reflection plate can already have enough reflection on it, so the absorber can be entirely black-opaque.

The primary object of the present invention is the simple and efficient way of reducing the stagnation temperature to values less than 100° C. This will enable completely new constructions of high efficiency solar collectors.

The secondary goal is to provide a solar collector which, when facade mounted and when not in use, contributes to reducing the heating of the object in the summer as it reflects the sun's radiation.

The tertiary objective of the present invention is to achieve the manageability of a desired solar radiation. Depending on the shape and inclination of the lenses from which the V-shaped surface is made, we can select the angle from which the light beam will be partially reflected and the amount of radiation to be reflected at the maximum irradiation of the solar collector and the angle from which the sun rays will be maximally used during the solar collector operation. This can, for example, weaken the solar collector operation when there is no need for hot water on the facility or when there is excess solar radiation, and will increase when the need for hot water is the greatest. When the sunlight falls at right angles on the solar collector, there is often a surplus of radiation, and when it falls at a sharp angle, it is necessary to maximize the utilization of an incoming radiation.

A further object of the invention is to provide a solar collector whose outer transparent plate and other transparent plates can be made of polymeric materials, thereby making the solar collector of less weight and cheaper to manufacture than the existing ones.

A further object of the invention is to achieve better mechanical properties of a solar collector since it is manufactured by a simultaneous multiple extrusion procedure, which ensures that it is made as a compact part, thereby facilitating simpler and cheaper mounting, especially on the vertical walls of buildings.

BRIEF DESCRIPTION OF THE DRAWINGS

In the following, the present invention will be described in detail with reference to drawings wherein.

DETAILED DESCRIPTION OF THE INVENTION

In order to facilitate understanding of the present invention, a series of terms is defined below. Here, the terminology is used to describe specific embodiments of the invention but their use does not limit the invention except as stated in the claims.

The term "upper", as used in the present patent application and claims, refers to the side of the surface, plate or surface facing the sunlight rays (sun).

The term "lower" as used in the present patent application and claims relates to the side of plates, panels or surfaces facing the absorber (60) or the base of the solar collector.

The term "inner" as used in the present patent application and claims relates to plates, panels or surfaces within the interior of the solar collector.

According to the present invention, a solar collector with reflecting surfaces comprises an outer transparent plate (10), one, two or three inner transparent plates (11; 12; 13), the transparent plates (10; 11; 12) are parallel to each other and enclose a first gap (30) and a second gap (31), the first and the second gap (30; 31) can be filled with air or a working fluid, channels (70) which are filled with either a working fluid or air, the channels (70) are on the underside enclosed by an absorber (60) for converting the sunlight into thermal energy, and enclosed on the upper side either with the transparent plate (11) or the absorber (60), a heat insulation (90) arranged on the lateral sides of the solar collector, and additional means for feeding or removing the working fluid. Said transparent plates (10; 11; 12; 13) comprise on their upper and/or lower sides either flat surfaces or a first toothed surface (20), a second toothed surface (40) and a third toothed surface (50; 51; 52), all mentioned toothed surfaces providing the direction or reflection of the sunlight beams depending on the fluid present in the channels (70) or in the gaps (30; 31).

Figure 1:
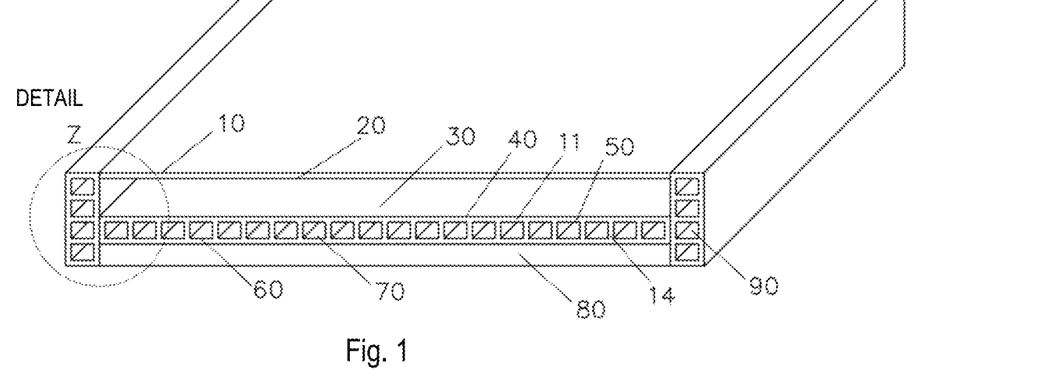
FIG. 1 shows a solar collector according to the first embodiment of the invention.

The first embodiment of the solar collector according to the present invention is shown in FIG. 1.

Figure 10:
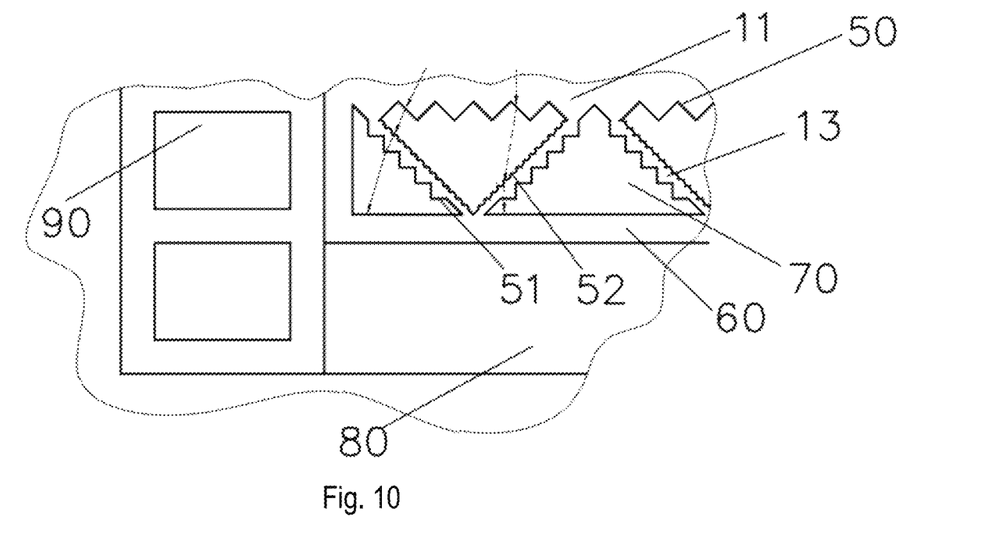
FIG. 10 shows an example of passing of a light beam in case of "V" shaped teeth with an angle of 90° at the vertex of the "V" shape (50) and (51) when glycol is circulating in a triangular cross section (70) channels.
Figure 11:
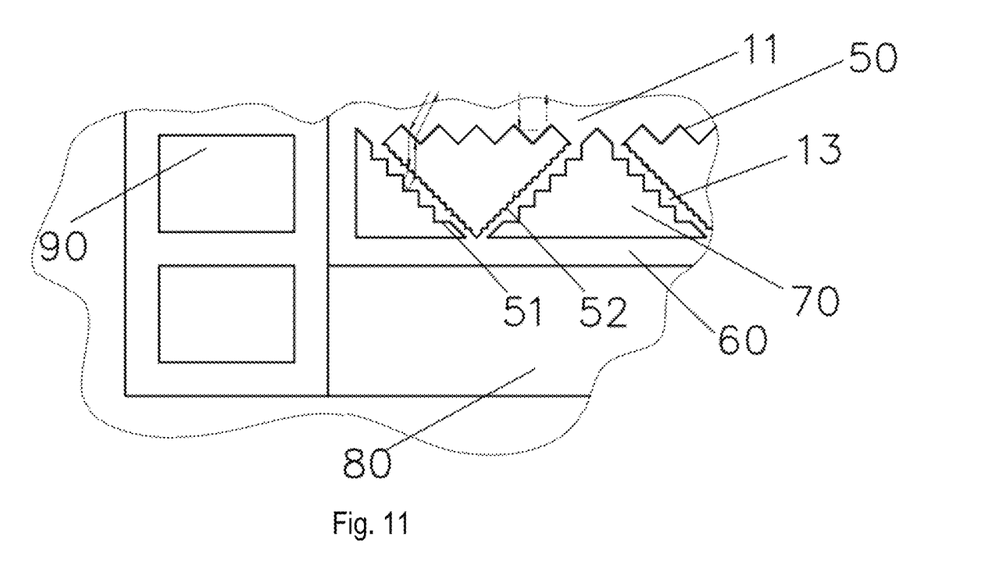
FIG. 11 shows an example of the reflection of a light beam in case of "V" shaped teeth with an angle of 90° at the vertex of the "V" shape (50) and (51) when air is present in a triangular cross section channel (70)

The solar collector comprises the outer transparent plate (10), a first gap (30) located between the outer transparent plate (10) and the transparent plate (11), the channels (70) through which circulates the working fluid, the channels (70) are closed on the upper side by the transparent plate (11), the absorber (60) for converting the sunlight into thermal energy, the absorber is located on the lower side of the channel (70), the heat insulation material (90) arranged on the lateral sides of the solar collector and optionally a heat insulating means (80) arranged on the underside of the solar collector, and additional means for bringing or removing the working fluid such as lids, tubes, etc. All parts except the thermal insulation means (80) can be produced by a multiple extrusion process. An airtight or vacuumed gap (30) is arranged between the underside of the surface of the outer transparent plate (10) and the transparent plate (11). The outer transparent plate (10) on the underside of its surface directed towards the gap (30) has the first toothed surface (20) whose toothed shapes are used for directing the light beams towards an upper surface of the transparent plate (11). The edge-facing plate (11) comprises the second toothed surface (40) whose toothed shapes are used to further direct the light beams. The transparent plate (11), whose underside defines the upper surface of the channel (70) comprises the third toothed surface (50) whose toothed shapes have a function of either direction or reflection of the light beams. The fluid contained in the channels (70) can be either the working fluid flowing through channels or the air. The channels (70) can have a rectangular, triangular, trapezoidal or polygonal cross-section. In the embodiment of the solar collector in which the channels (70) have a rectangular cross section, the third toothed surface (50) is arranged on the underside of the transparent plate (11) as shown in FIGS. 1-9 and 12-15. In the embodiment of the solar collector in which the channels (70) have a triangular cross section, as shown in FIGS. 10 and 11, the channel (70) whose one side of the triangular cross section is bounded by the lower side of the transparent plate (11) comprises a toothed surface (50) whereas the triangular cross-section sides across (70) make up surfaces that can be toothed or not (52) and a toothed surface (51). The channel (70) adjacent to the channel (70) having one side of a triangular cross-section defined with the absorber (60) comprises a maximum of two thirds of the toothed surfaces (51).

The toothed surfaces (20), (40), (50), (51) and (52) each contains a plurality of toothed shapes. Said shapes can be wavy or toothed in a way that the tips of their teeth or waves extend in the longitudinal direction of the solar collector channel (70). A lateral walls of the toothed surfaces (20), (40), (50), (51) and (52) can be formed by the shapes that can be flat, i.e. "V" shaped, as well as convex, concave, or curved in various shapes. In a preferred embodiment of the invention, the lateral walls of the toothed surfaces (50) and (51) are flat, i.e., they form a "V" shape with an angle at the top or vertex of the "V" shape equal to or greater than 90°. The toothed surfaces (20), (52) have an optical lens function, i.e. direct the light beams, and the toothed surfaces (40), (50) and (51) have the function of optical lenses and/or optical prisms, i.e., they either direct or reflect the light beams; or they both direct and reflect them. According to the present invention, each of said toothed surfaces (20), (40), (50), (51) and (52) may be formed by variously toothed shapes, i.e. in one solar collector, each of the said toothed surfaces may apply one shape or their mutual combination.

In the embodiment of the triangular, trapezoidal or polygonal cross section of the channel (70), the third toothed surfaces (50) and (51; 52) consist of a plurality of toothed shapes having an outer shape that implies the critical angle of reflection between the transparent plates (11) (13) and the working fluid in the channels (70) for directing the light beams to the channels (70), whereas at the same time providing a greater reflection angle between the transparent plates (11), (13) and the air or vacuum, when in the channels (70) the working fluid is not circulating but there is air, thereby providing the reflection of the light beams back to the outer transparent plate (10), the outer toothed shapes on the third toothed surfaces (50) and (51; 52) depending on the working fluid type circulating in the channels (70).

The light beams pass through the upper flat surface of the outer transparent plate (10), toward the gap (30). The first toothed surface (20) of the outer transparent plate (10) directs light beams at a preferred angle towards the upper surface of the transparent plate (11) formed as the second toothed surface of (40). The light beams passing through the transparent plate (11) are again directed towards the third toothed surface (50). On the third toothed surface (50) the beam of light is either reflected or partially reflects (if in the channels (70) is the air), and the remaining light beams reach the toothed surface (52) where they are further directed to be reflected on the surface (51). If in channels (70) is present the working fluid, light beams will pass through the toothed surfaces (50), (51), (52) and the working fluid. If the channels (70) are filled with air, a large proportion of light beams is reflected due to a large number of toothed shapes, where the light actually reflects on the two toothed surfaces within the shape, as the angle at which light beams fall on the inner surfaces of the third toothed surfaces (50) and (51) is greater than the critical reflection angle between the transparent plate (11) and the air in the channels (70). If the channels (70) are filled with the working fluid, the third toothed surfaces (50) and (51) do not reflect, but the light beam passes through the working fluid to reach the absorber (60), where the sun's radiation is converted into thermal energy further removed by the working fluid flowing through the channels (70).

This embodiment further allows the gap (30) to be filled with the working fluid and, through the outer transparent plate (10), exchanges the heat with the environment when in the channels (70) is not the working fluid, i.e. the channels are filled with the air. The outer transparent plate (10) is made of polycarbonate or another transparent material having high absorption and emission of infrared radiation, thereby further improving the exchange of heat with the environment (beside conduction and convection).

Figure 3:
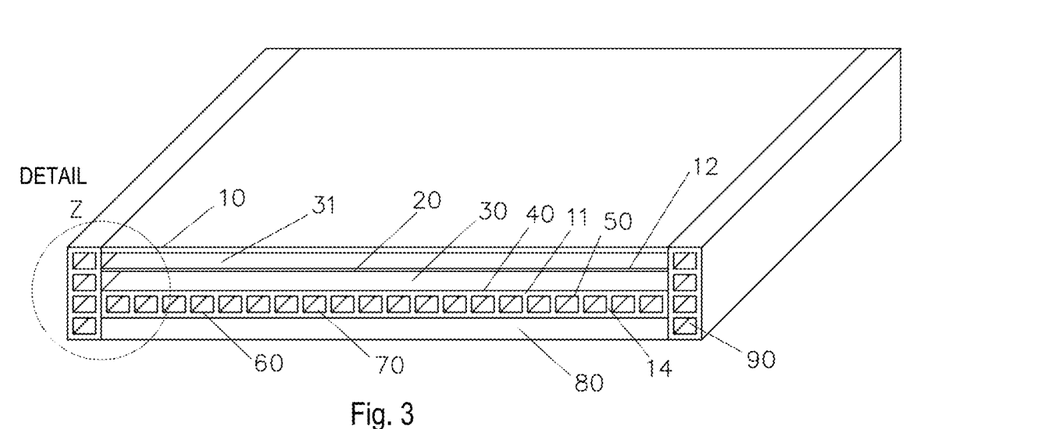
FIG. 3 shows a solar collector according to the second embodiment of the invention.
Figure 3A:
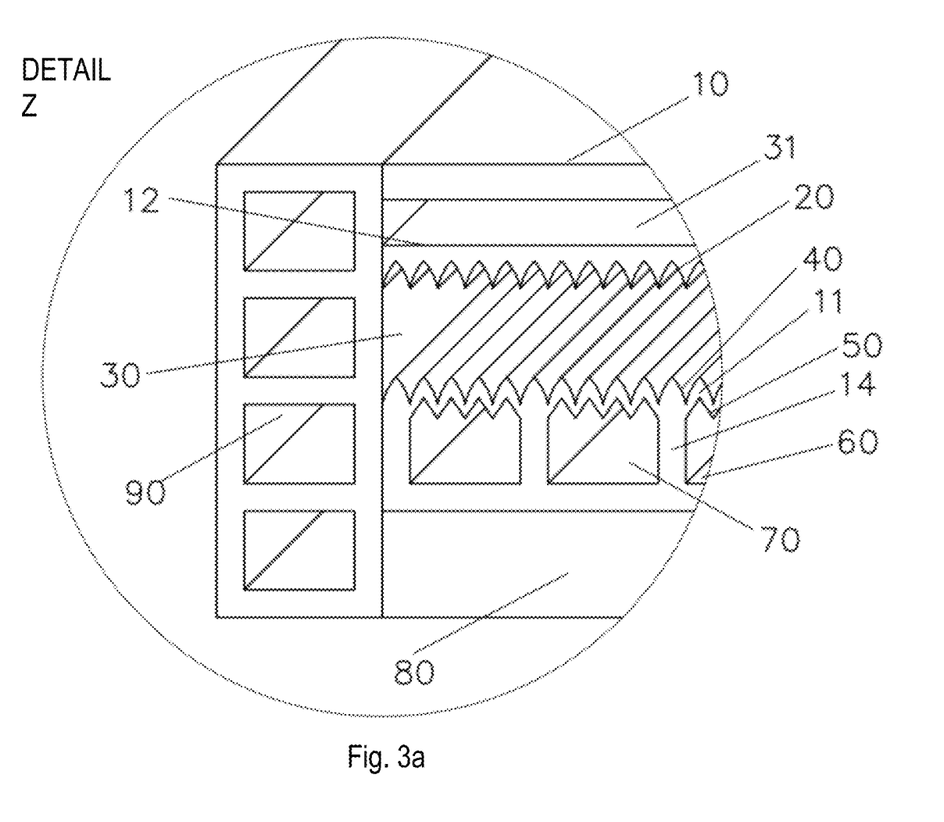
FIG. 3a shows a detail "Z" of the solar collector illustrated in FIG. 3.

The second embodiment of the solar collector according to the present invention is shown in FIG. 3. As with the first embodiment of the solar collector of FIG. 1, the toothed surfaces (20), (40), (50) and (52) have the function of optical lenses, i.e. either direct or reflect the beam of light. The lateral walls of the toothed surfaces (20), (40), (50), (51) and (52) can be formed of the toothed shapes that can be flat, i.e., "V" shaped, convex, concave, or curved in various shapes. In a preferred embodiment of the invention, the lateral walls of the toothed surfaces (50) and (51) are flat, i.e., they form a "V" shape with an angle at the vertex of the "V" shape equal to or greater than 90°. Further, each of said toothed surfaces (20), (40) and (50), (51) and 52) may be formed by a differently toothed shape, i.e., in one solar collector, each of the said toothed surfaces may apply one shape or their mutual combinations.

The solar collector shown in FIG. 3 comprises an outer transparent plate (10) and a second transparent plate (12), a second gap (31) located between the outer transparent plate (10) and the second transparent plate (12) a first toothed surface (20) oriented towards a first gap (30), wherein the first gap (30) is located between the second transparent plate (12) and the transparent plate (11). The upper side of the transparent plate (11) comprises a second toothed surface (40) oriented towards the first gap (30), and on its lower side there is a third toothed surface (50) oriented towards the absorber (60) for converting the light into thermal energy, the channels (70) through which flows (circulates) the fluid, the heat insulation (90) arranged on the lateral side of the solar collector and optionally the heat insulation (80) arranged on the lower side of the solar collector, as well as additional means for bringing and removing the working fluid, such as lids, pipes, etc. In the embodiment shown in FIG. 3, the opaque absorber (60) for converting the light into thermal energy is located at the bottom of the channel (70).

The solar collector operating principle shown in FIG. 3 is identical to that of FIG. 1, with an additional possibility that the second gap (31) is filled with the working fluid so that the outer transparent plate (10) exchanges heat with the environment, regardless of whether the solar collector works or not, i.e. whether the channels (70) circulate the working fluid or the air fills the channels. The outer transparent plate (10) is made of polycarbonate or another transparent material having high absorption and infrared emission, thereby further improving the exchange of heat with the environment (beside conduction and convection).

Figure 4:
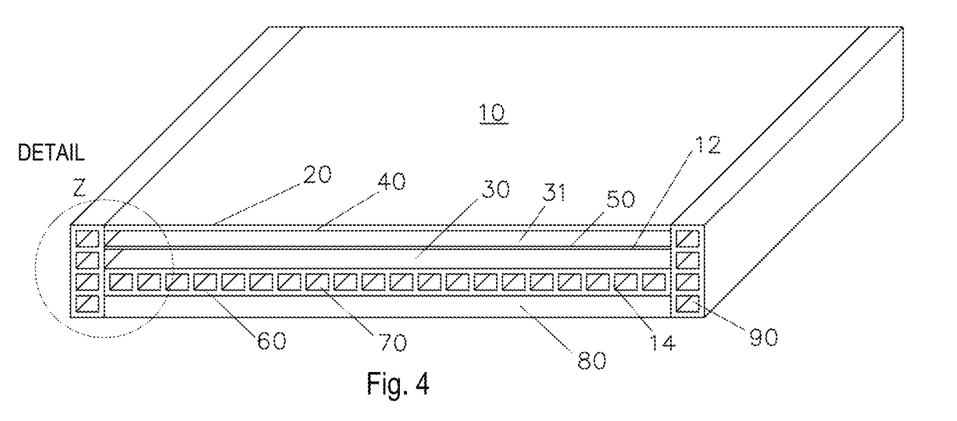
FIG. 4 shows a solar collector according to the third embodiment of the invention.

In the embodiment of the solar heat collector shown in FIG. 4, the solar collector comprises a second transparent plate (12) located between the outer transparent plate (10) and the first gap (30) and forming an additional second gap (31). The outer transparent plate (10) on the side of the plate which is oriented toward the outer space or the environment comprises the first toothed surface (20) and on the side facing the second transparent panel (12) the second toothed surface (40). The tooth shapes of the first toothed surface (20) serve to direct the light beams to the second toothed surface (40) located on the underside of the outer transparent plate (10) and directed towards the second gap (31). The second toothed surface (40) serves for passing light beams or reflecting and partially passing the light beams towards the transparent plate (12) which has the third toothed surface (50) on its upper side, which can further re-direct the light beams.

Figure 5:
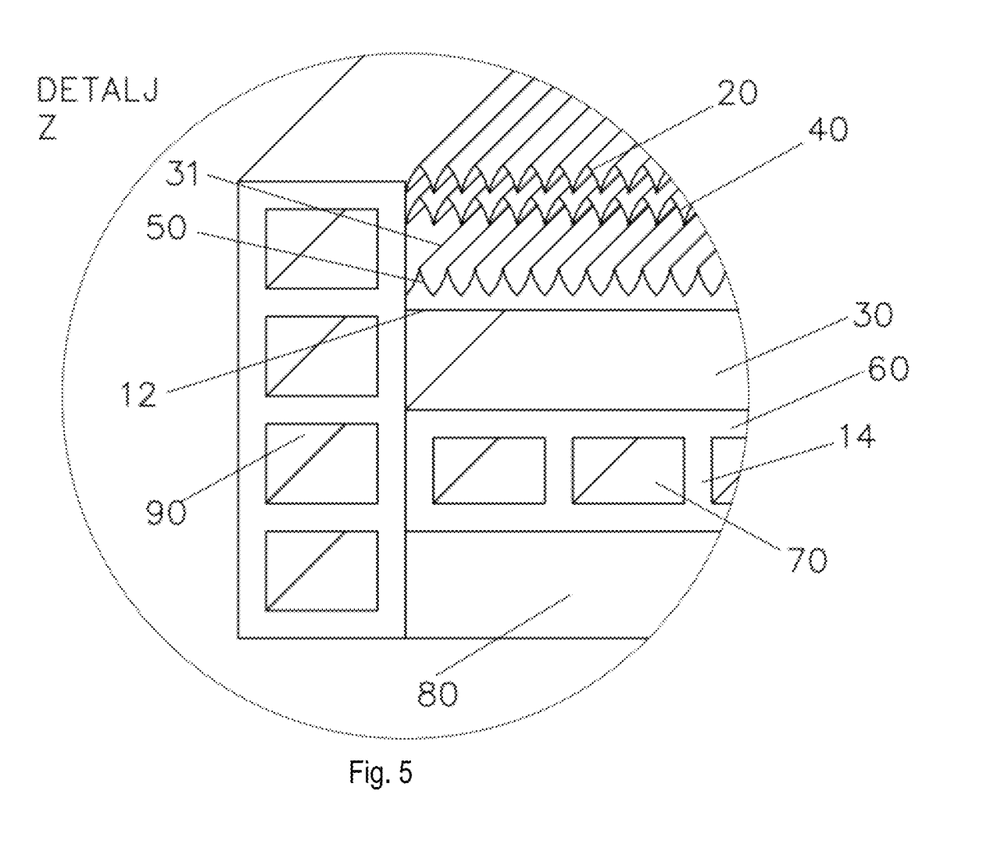
FIG. 5 shows a detail "Z" of the solar collector illustrated in FIG. 4.

FIG. 5 shows the detail "Z" from FIG. 4. The upper surface of the outer transparent plate (10), to which the light beams originally fall, is constructed as the first toothed surface (20) and serves to direct the light beams. A lower inner surface of the outer transparent plate (10), which is oriented toward the second gap (31), is constructed as the second toothed surface (40). The second gap (31) is on the underside bordered by the second transparent plate (12), the surface bordering the second gap (31) being constructed as the third toothed surface (50) for directing the light beams and, if necessary, reflecting them from the flat surface of the transparent plate (12) oriented toward the first gap (30). A lower side of the plate (12) directed toward the first gap (30) and the absorber (60) is constructed as a flat surface. The first gap (30) between the transparent plate (12) and the absorber (60) which confines the channels (70) is filled with air, or there may be a vacuum within. In the embodiment shown in FIG. 4, the opaque absorber (60) is located on the upper side of the channel (70).

Light beams falling on the upper surface of the outer transparent plate (10) and its first toothed surface (20) are directed towards the second toothed surface (40), and if the air is in the second gap (31), the portion of the light beams is reflected on the second toothed surface (40) and the other portion is directed towards the third toothed surface (50) where the light beams are directed back to the lower flat surface of the transparent plate (12) bordering the first gap (30) at an angle greater than the critical reflection angle, and are reflected back towards the upper surfaces and back into the environment.

If the working fluid circulates in the second gap (31), the light beams falling on the upper surface of the outer transparent plate (10) and its first toothed surface (20) are directed towards the second toothed surface (40) and further to the third toothed surface (50) and to the absorber (60) where the energy of the light beams is converted into heat energy and further removed by the working fluid passing through the channels (70).

Figure 6:
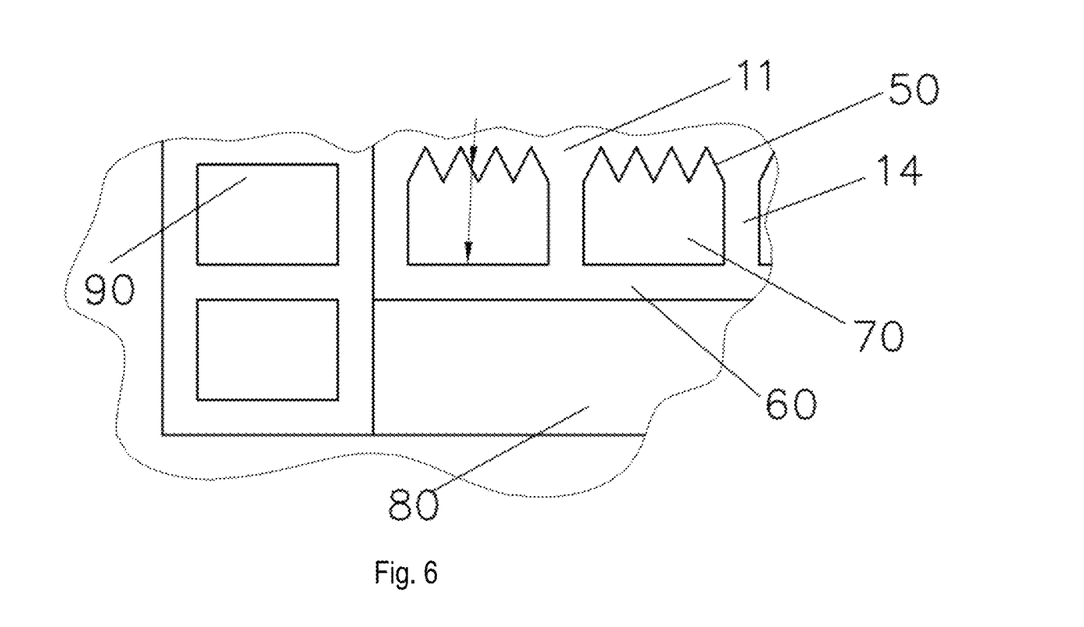
FIGS. 6 and 7 show an example of passing of a light beam in case of "V" shaped teeth with an angle of 90° at the vertex of the "V" shape when glycol circulates in the channels (70)

FIG. 6 shows an example of passing of the light beam for the lateral wall of the toothed surfaces (50) formed by the multiple "V" shaped teeth with an angle of 90° at the vertex of the "V" shape, for a solar radiation of 546 nm wavelength, for the outer transparent plate (10) and the transparent plate (11), both plates are made of polycarbonate (refractive index n=1.59). The light beams pass through the outer transparent plate (10), the first toothed surface (20) and the second toothed surface (40), fall onto the lateral wall of the toothed surface (50) at an angle of 5° to the normal of the transparent plate (11) where in the channels (70) of the solar collector circulates the working liquid glycol (refractive index n=1.43). The critical angle for total internal reflection for polycarbonate-glycol transition, relative to the vertical lateral wall of the third toothed surface (50) is 64°. The light beam passes through the outer transparent plate (10), the first toothed surface (20), the first gap (30), and the second toothed surface (40), and falls at an angle of 50° to the normal of the lateral wall of the third toothed surface (50) made of the polycarbonate. Since the angle of 50° is lower than the critical angle of total reflection of 64°, the light beams enter glycol, and further through the glycol almost all the energy is delivered to the absorber (60) which converts the energy of solar radiation into thermal energy.

Figure 7:
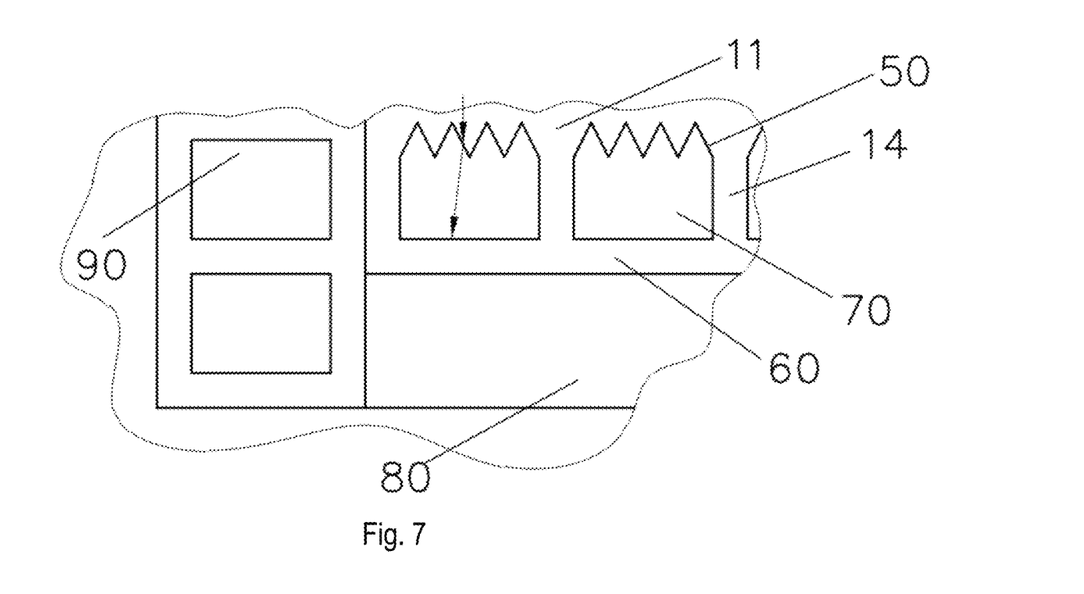

FIG. 7 shows an example of passing of the light beam in case of a lateral wall of the toothed surface (50) formed by "V" shaped teeth with an angle of 90° at the vertex of the "V" shape, for a wavelength of solar radiation of 546 nm, for the solar collector made of polycarbonate (refractive index n=1.59). The light beams passing through the surface of the outer transparent plate (10), the first toothed surface (20) and the second toothed surface (40) fall to the lateral wall of the third toothed surface (50) at an angle of 0° relative to the normal of the transparent plate, where in the channels (70) of the solar collector circulates the working fluid glycol (refractive index n=1.43). The critical angle of reflection between polycarbonate and glycol is 64° relative to said vertical. The light beams pass through the outer transparent plate (10), the first toothed surface (20), the first gap (30), and the second toothed surface (40) and reach the normal (of the lateral wall) of the third toothed surface made of polycarbonate (50) at an angle of 45°. As the angle of 45° is lower than the critical angle of total reflection 64°, the light beam is refracted and passes through glycol, and further through the glycol almost all the energy is delivered to the absorber (60), which converts the energy of solar radiation into thermal energy.

Figure 8:
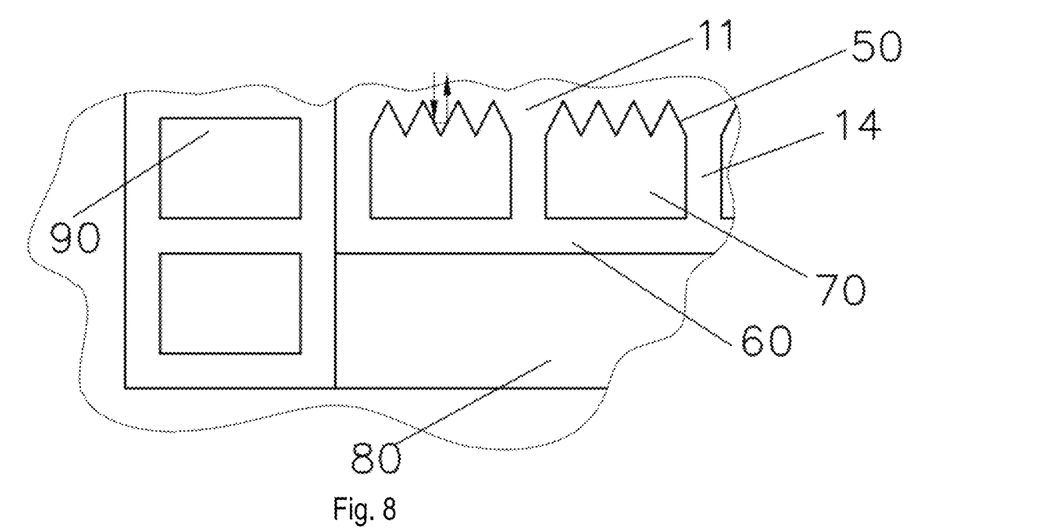
FIGS. 8 and 9 show an example of the reflection of a light beam from "V" shaped teeth with an angle of 90° at the vertex of the "V" shaped tooth when air is in the channels (70)

FIG. 8 shows an example of reflecting of the light beam for the lateral wall of the toothed surface (50) formed by "V" shaped teeth with an angle of 90° at the vertex of the "V" shape, for a wavelength of solar radiation of 546 nm, for the solar collector made of polycarbonate (refractive index n=1.59), when light beams fall on the solar collector at an angle of 0° relative to the normal of the lateral edge of the transparent plate (11), when the air (refractive index n=1) is present in the channels (70) of the solar collector. The critical angle of total reflection between the polycarbonate and the air for the polycarbonate-air boundary is 39° relative to the normal of the lateral edge of the third toothed surface (50). The light beam passes through the outer transparent plate (10), the first toothed surface (20), the first gap (30), and the second toothed surface (40), and falls at an angle of 45° to the normal of the lateral edge of the third toothed surface (50), which is made of polycarbonate. Since the angle of incidence of the light beam is greater than the critical angle of reflection 39°, the light beam is reflected and falls on the other adjacent surface (50) again at angle of 45°, and again reflects and returns substantially parallel with the incoming beam, being returned to the environment in the opposite direction.

Figure 9:
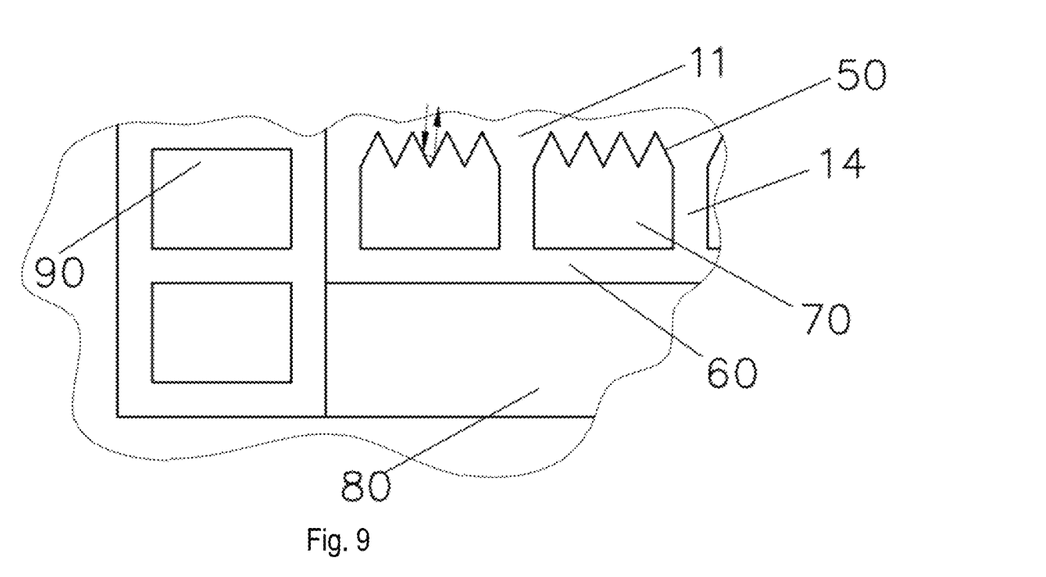

FIG. 9 shows the same example from FIG. 7 in case the light beams fall to a solar collector at an angle of 5° relative to the vertical edge of the outer transparent plate (11). Since the angle of incidence of the light beam on the vertical edge of the third toothed surface (50) made of polycarbonate is 50°, which is greater than the critical angle of reflection of 39°, the light beam is reflected and falls onto the adjacent surface (50) at an angle of 40°, which is greater than the critical angle of reflection of 39° and again reflects and returns substantially parallel with the incoming beam, being returned to the environment in the opposite direction.

FIG. 10 shows an example of the lateral walls of the toothed surfaces (50) and (52) formed by "V" shaped teeth, with an angle of 90° at the vertex of the "V" shape for the solar collector whose channels (70) have a triangular cross section, and for the wavelength of solar radiation of 546 nm. The transparent plate (11) is made of polycarbonate (refractive index n=1.59). In the channels (70) circulates the working fluid glycol (refractive index n=1.43). The light beam passes through the outer transparent plate (10), the first toothed surface (20), the first gap (30), and the second toothed surface (40), and reaches the vertical edge of the third toothed surface (50) of the polycarbonate at an angle smaller than the critical angle of reflection of 64°, enters the glycol, and through the glycol reaches the toothed surface (52) and enters polycarbonate. Leaving the polycarbonate, the angle at which it reaches the polycarbonate surface (51) is lower than the critical angle of reflection of 64°, so the light beam re-enters the glycol, and through the glycol it reaches the absorber (60), delivering almost the whole energy to the absorber (60), which converts the energy of solar radiation into thermal energy.

FIG. 11 shows the same example as in FIG. 10 for one beam in the case when there is air in the channels (70) of the triangular section and in that case the light beam is reflected in a way that it returns from the transparent plate (11) back to the environment. In the case when the light beam falls on the normal of lateral wall of the toothed surface (50) at a 0° angle, which is lower than 39°, the light beam passes through a polycarbonate wall and enters the air in the channels (70), from the channels (70) it falls on the toothed surface (52) and enters the transparent plate (13), falling onto the wall of the toothed surface (51) at an angle greater than 39° to the normal, further reflects from one wall to another, where it falls again at an angle greater than 39° to the normal, reflecting to the wall (52), which can be flat or toothed, where it refracts and leaves the outer wall of the toothed surface (50), further refracting and leaving from the transparent plate (11) back into the environment.

The transparent plates (13) are located inside the channel (70), by means of the surface (52) they direct, and by means of the surface (51) they reflect the light beams when the channels (70) are filled with air. The position of the transparent plate (13) can be such that it replaces the transparent plate (14) because besides directing and reflecting the light beam, it also has a constructive role, i.e. mechanically spacing as shown in FIGS. 10 and 11. The position of the transparent plates (13) can be such that it only performs directing and reflecting the light beams, and that they are mutually parallel or sloping in relation to the plate (11), where the transparent surface (14) is a constructive element as shown in FIG. 17.

Figure 12:
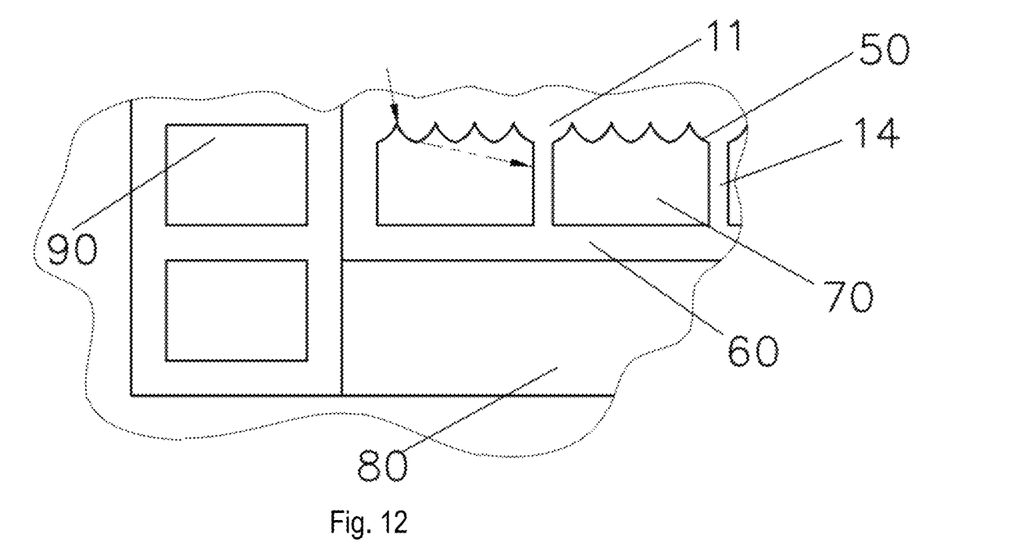
FIG. 12 shows an example of passing of a light beam convex shaped teeth when glycol circulates in the channels (70)
Figure 13:
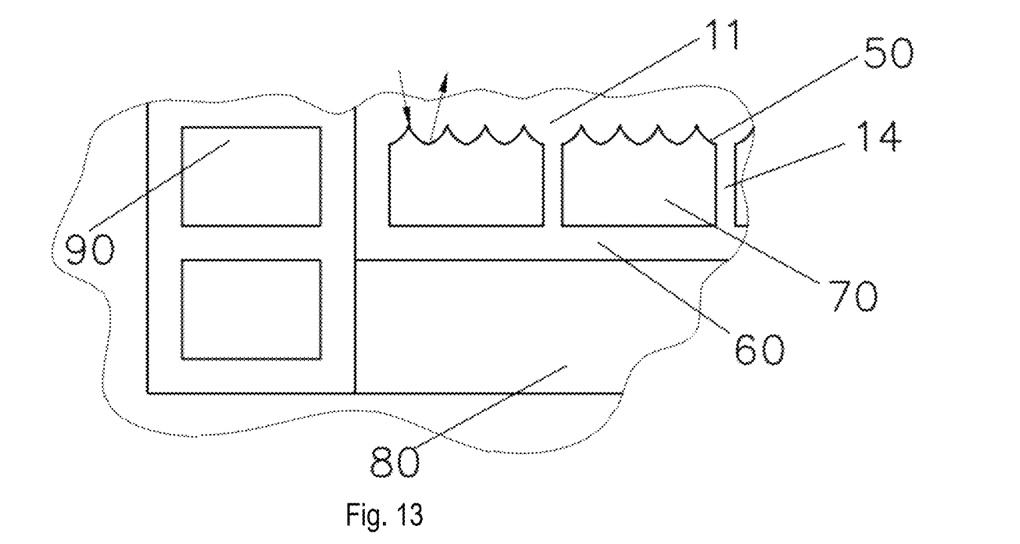
FIG. 13 shows an example of a light beam reflection from convex shaped teeth when air is present in the channels (70)

FIGS. 12 and 13 illustrate an embodiment of the invention wherein the lateral walls of the toothed surface (50) have a convex shape, for a wavelength of solar radiation of 546 nm, and a polycarbonate transparent plate (11) (refractive index n=1.59). The light beams pass through the outer transparent plate (10), the first toothed surface (20), and the second toothed surface (40), fall on the lateral wall of the toothed surface (50) at an angle of 8° relative to the normal of the solar collector. FIG. 12 shows an example in case of circulating glycol in the channels (70), and because of the refractive index of n=1.43 between the transparent plate wall (11) made of polycarbonate and glycol, the light beam passes as described above. FIG. 13 shows an example in case the air is present in the channels (70), and because of the refractive index n=1.43 between the transparent plate (11) made of polycarbonate and glycol, the light beam is reflected as explained above.

Figure 14:
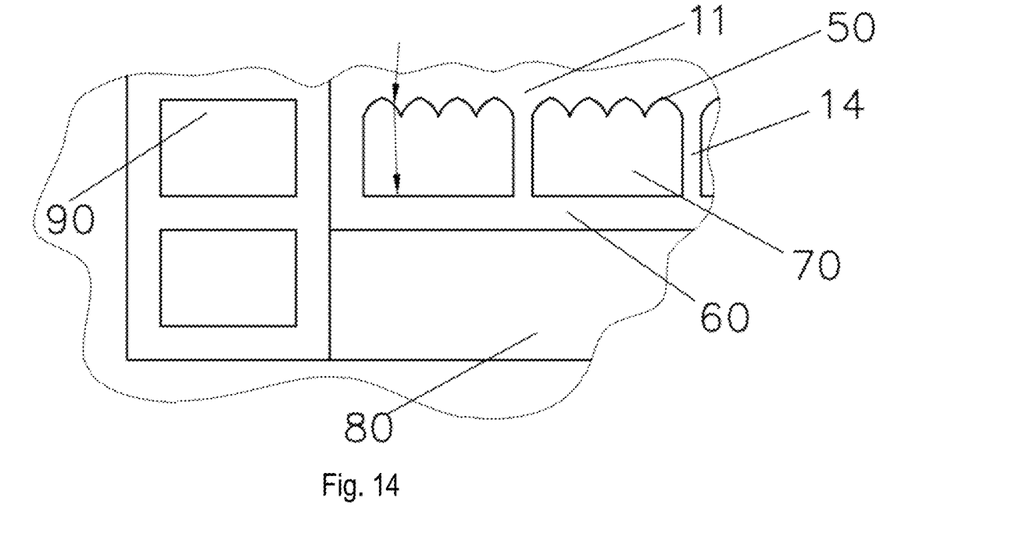
FIG. 14 shows an example of passing of a light beam trough concave shaped teeth when glycol circulates in the channels (70)
Figure 15:
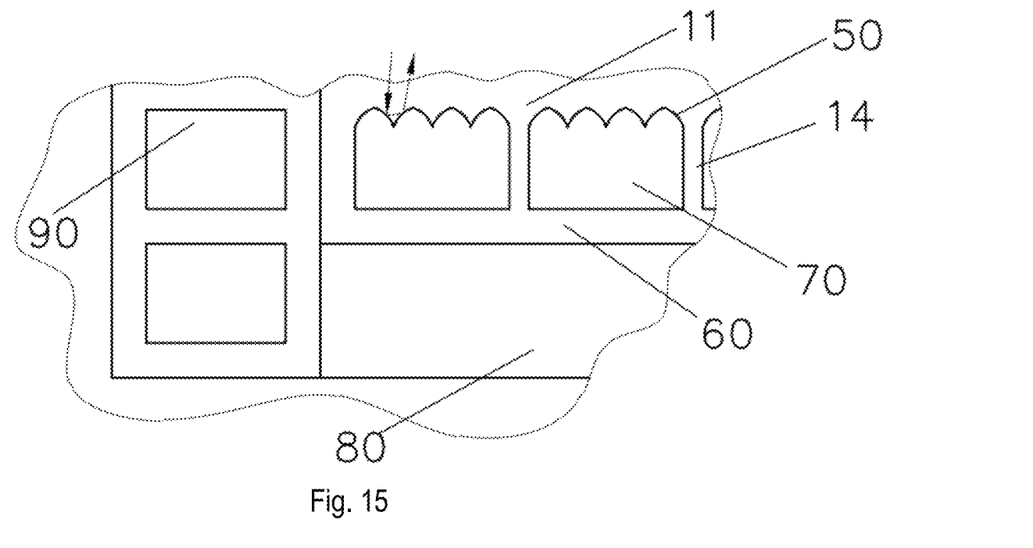
FIG. 15 shows an example of a light beam reflection from concave shaped teeth when air is present in the channels (70)

FIGS. 14 and 15 show an embodiment of the invention wherein the lateral walls of the toothed surfaces (50) have a concave shape for a wavelength of 546 nm solar radiation for the outer plate (10) and the transparent plate (11) both made of polycarbonate (refractive index n=1.59). The light beams pass through the outer transparent plate (10), the first toothed surface (20), and the second toothed surface (40), fall on the lateral wall of the toothed surface (50) at an angle of 8° relative to the normal of the solar collector. FIG. 14 shows an example in case where glycol circulates in the channels (70), and due to the refractive index of n=1.43 between the wall of the transparent plate (11) made of polycarbonate and glycol, the light beam passes as described above. FIG. 15 shows an example in case the air is present in the channels (70) and due to the refractive index of n=1.43 between the wall of the transparent plate (11) of polycarbonate and the air, the light beam is reflected as explained above.

Figure 17:
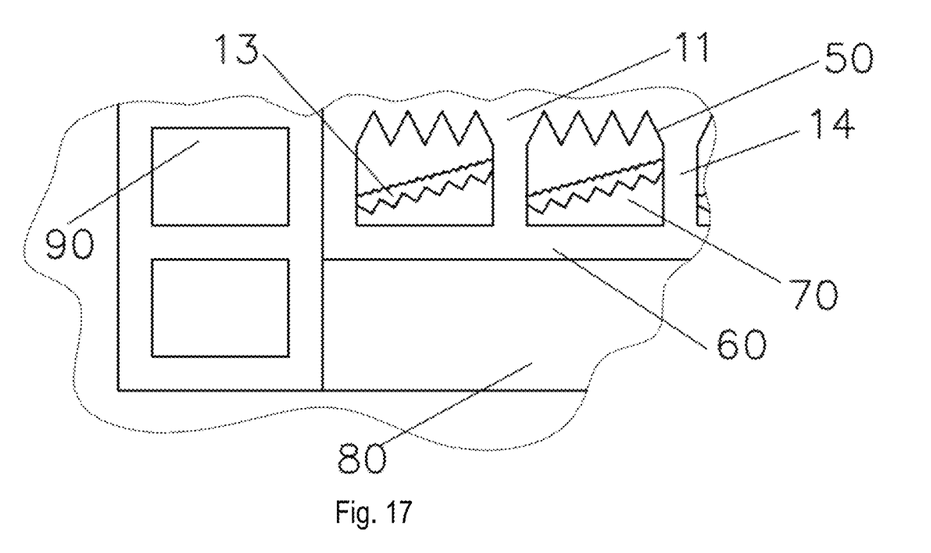
FIG. 17 shows an embodiment of a rectangular cross-sectional channel (70) having transparent plates (13) and (14).

FIG. 17 shows another embodiment of a rectangular cross section channel (70) comprising the transparent plate (14) mechanically holding the gap between the transparent plate (11) and the absorber (60) restricting the channels (70) and the transparent plate (13) within the channel (70).

Figure 2:
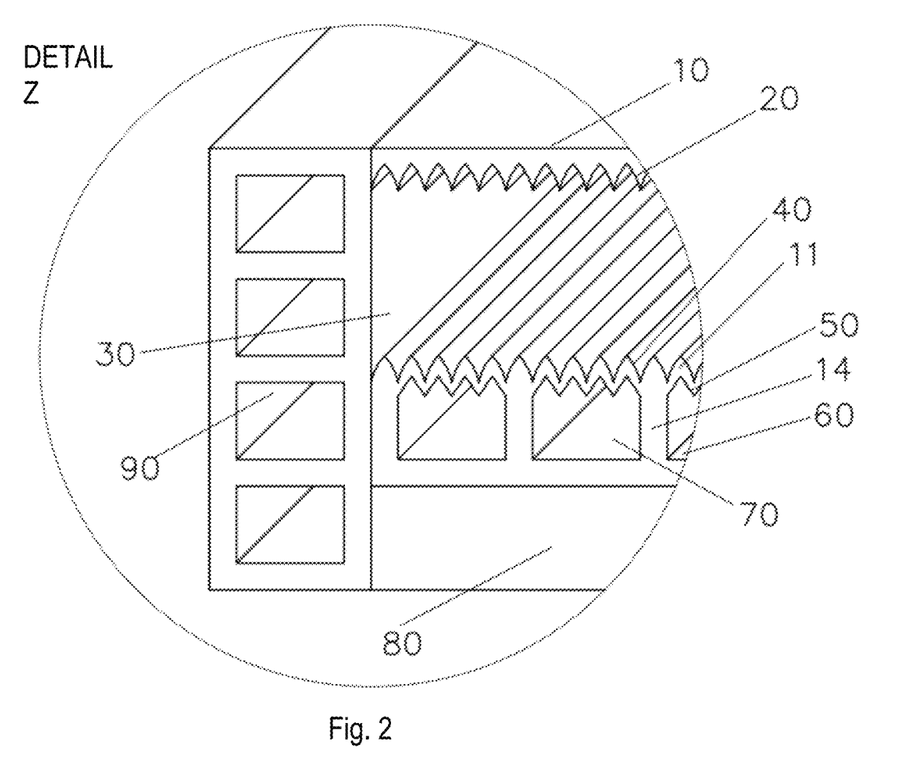
FIG. 2 shows a detail "Z" of the solar collector illustrated in FIG. 1.
Figure 16:
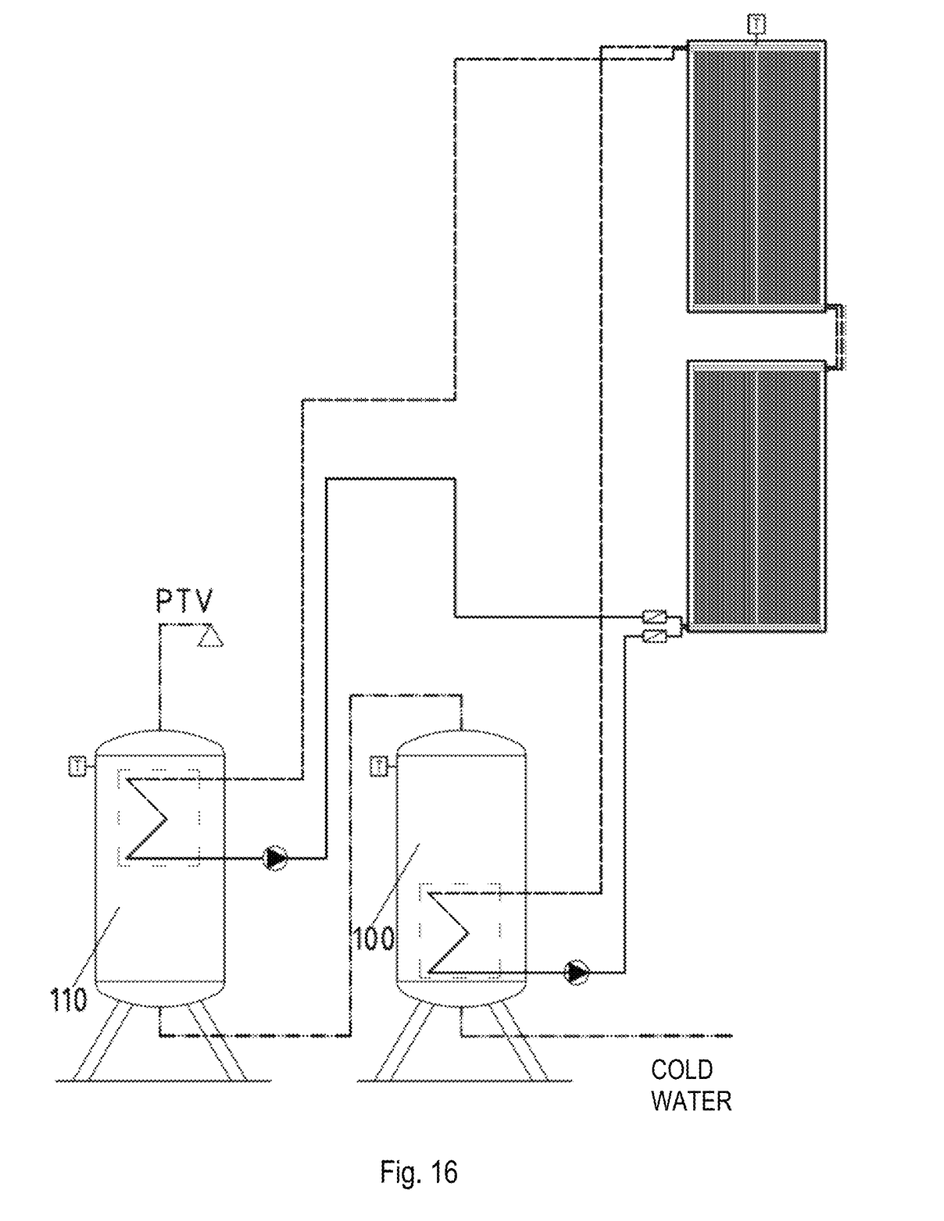
FIG. 16 shows a connection of a solar collector containing an additional transparent plate with two heat tanks.

The solar collector shown in FIGS. 1 to 4 can be implemented in such a way that in the first gap (30) according to the present invention shown in FIGS. 1 and 2, or in the second gap (31) according to the present invention shown in FIGS. 3 and 4, there is liquid circulating. The working fluid running through the channels (70) can flow to the same tank, or it may flow into separate tanks which can be cascade-connected as shown in FIG. 16. According to the present invention it is contemplated that, depending on the solar collector design, the first gap (30) or the second gap (31) are connected through the pipeline with a first tank (100), and the channels (70) through which the working fluid flows with a second tank (110).

For the embodiment of the solar collector containing the first gap (30), FIG. 16 shows an example in which the working fluid flowing through the first gap (30) removes the waste heat into the first tank (100) where the lower temperature ranges from 0-20° C., or it can be used to heat the heat pump evaporator that can use heat from low temperature liquids, and the working liquid running through the channels (70) draws heat into the second tank (110) where the temperature ranges from 50 to 70° C., commonly used for hot water consumption. The tanks (100) and (110) are cascade-connected in such a way that cold water of temperature of about 15° C. first enters the first tank (100) and is then brought to the second tank (110). This results in a system of exceptionally high efficiency because the losses through the outer transparent plate (10) are reduced, if the outside temperature is about 20-30° C., since instead of transferring the heat from the outer transparent plate (10) into the environment, it is transferred to the liquid in the first gap (30), which is then removed into the first tank (100).

The solar collector shown in FIGS. 3 and 4 can be implemented in such a way that an additional transparent plate (12) is placed in the first gap (30) and thus creates an additional second gap (31). The embodiment of the present invention with the additional transparent plate (12) also allows the solar collector to be connected in accordance with the embodiment shown in FIG. 16. FIG. 16 shows an example in which a liquid flowing through the second gap (31) bounded by the outer transparent plate (10) and the additional transparent plate (12) can draw the waste heat into the first tank (100) where the lower temperature is within the range of 20-40° C., or can be used to heat the heat pump evaporator which can use the heat from low temperature liquids and the working fluid passing through the channels (70) draws the heat into the tank (110) in which the temperature ranges from 50 to 70° C., commonly used for hot water. The tanks (100) and (110) are cascade-connected so that a cold water of about 15° C. first enters the first tank (100) and is then taken to the second tank (110). As in the previous case, heat losses through the outer transparent plate (10) are reduced, in case the ambient temperature is around 20-30° C., as the heat is instead of into the environment, removed to the first tank (100) by the liquid flowing through the first gap (30).

From the foregoing description of the invention, it is evident that various changes, variations and modifications may be applied to the solar collector according to the present invention, which do not extend beyond the scope of the claims defined below. Accordingly, the description of the invention and the accompanying drawings are considered to be illustrative and should not be construed as limiting the scope of the invention.

LIST OF REFERENCE SIGNS USED 10 outer transparent plate
11 transparent plate
12 second transparent plate
13 transparent plate within the channel 70
14 transparent plate within the channel 70
20 first toothed surface
30 first gap between the outer transparent plate 10 and the transparent plate 11
31 second gap between the other transparent plate 12 and the transparent plate 11
40 second toothed surface
50 third toothed surface
51 third toothed surface
52 third toothed surface
60 absorber
70 channels circulating fluid
80 insulation material
90 structural insulation material always filled with air
100 heat exchanger with a first tank
110 heat exchanger with a second tank

The invention claimed is:

1. A solar collector with reflecting surfaces comprising an outer transparent plate and an inner transparent plate, the inner and outer transparent plates being parallel to each other and enclosing a first gap, the first gap being airtight and filled with air or a vacuum, channels through which air or a working liquid flows, a thermal insulation means arranged on lateral sides of the solar collector, and additional means for bringing or draining the working liquid, wherein the channels are on the underside made of an absorber for conversion of solar radiation energy into the thermal energy and on the upper side are enclosed by the inner transparent plate, wherein the inner transparent plate has an upper surface which is a first toothed surface comprising a plurality of teeth extending in the longitudinal direction of the channels, and the inner transparent plate has a lower surface which is a second toothed surface with a plurality of teeth extending in the longitudinal direction of the channels, the first and second toothed surfaces serving for direction of solar radiation when the working liquid is present in the channels or reflection of solar radiation when air is present in the channels.

2. The solar collector according to claim 1, wherein the outer transparent plate has at its upper and lower side flat surfaces, and the inner transparent plate has at its upper side a flat surface.

3. The solar collector according to claim 1, wherein the outer transparent plate on the underside of the surface directed towards the first gap has a toothed surface comprising a plurality of teeth extending in the longitudinal direction of the channels.

4. The solar collector according to claim 1, wherein the outer transparent plate, the inner transparent plate and the channels are made of polymeric materials or transparent composites, or their mutual combination.

5. The solar collector according to claim 4, wherein the outer transparent plate, the inner transparent plate, the channels, the absorber and the thermal insulation material are made as one compact part by simultaneous multiple extrusion.

6. The solar collector according to claim 1, wherein lateral walls of the teeth of at least one of the first and second toothed surfaces are convex shaped.

7. The solar collector according to claim 1, wherein lateral walls of the teeth of the first toothed surface and the second toothed surface are convex shaped.

8. A solar collector, comprising:
an outer transparent plate having an upper surface and a lower surface;
an inner transparent plate having an upper surface and an lower surface;
the outer transparent plate and inner transparent plate being spaced part and having lateral side walls, thereby defining a cavity;
an absorber surface for absorbing solar radiation and radiating thermal energy positioned below the inner transparent plate;
a plurality of channels positioned between the inner transparent plate and the absorber surface;
at least one of the outer transparent plate and the inner transparent plate having both an upper surface and a lower surface having longitudinal teeth, whereby the outer or inner transparent plate reflects solar radiation when there is no solar collector working fluid in the cavity or the channels and transmits solar radiation therethrough when there is a solar collector working fluid in the cavity or the channels.

9. The solar collector of claim 8 wherein the inner transparent plate has both an upper surface and a lower surface having longitudinal teeth.

10. The solar collector of claim 9 wherein the outer transparent plate has a lower surface having longitudinal teeth.

11. The solar collector of claim 9 wherein a second transparent plate is located between the outer transparent plate and the inner transparent plate and the second transparent plate has a lower surface having longitudinal teeth.

12. The solar collector of claim 9 wherein the outer transparent plate has a lower surface having longitudinal teeth.

13. The solar collector of claim 8 wherein the outer transparent plate has both an upper surface and a lower surface having longitudinal teeth.

14. The solar collector of claim 8 wherein one or more of the outer transparent plate and the inner transparent plate are made of polymeric materials.

15. The solar collector of claim 8, wherein the longitudinal teeth are longitudinally extending V-shaped teeth.

16. The solar collector of claim 15, wherein the longitudinal teeth are longitudinally extending V-shaped teeth having curved side surfaces.

17. The solar collector of claim 16, wherein the longitudinal teeth are longitudinally extending V-shaped teeth having concave or convex curved side surfaces.

18. A solar collector, comprising:
an outer transparent plate having an upper surface and a lower surface;
an inner transparent plate having an upper surface and an lower surface;
the outer transparent plate and inner transparent plate being spaced part and having lateral side walls, thereby defining a cavity;
the inner transparent plate upper and lower surfaces being toothed surfaces, the inner transparent plate upper and lower surfaces reflecting solar radiation when there is no solar collector working fluid adjacent thereto and transmitting solar radiation through the inner transparent plate when there is a solar collector working fluid adjacent thereto;
an absorber surface for absorbing solar radiation and radiating thermal energy positioned below the inner transparent plate; and
a plurality of channels positioned between the inner transparent plate and the absorber surface.

19. The solar collector of claim 18, wherein the inner transparent plate upper toothed surface comprises longitudinally extending V-shaped teeth.

20. The solar collector of claim 19, wherein one or more of the outer transparent plate and the inner transparent plate are made of polymeric materials.

* * * * *